United States Patent [19]

Echevarria et al.

[11] Patent Number: 4,858,263
[45] Date of Patent: * Aug. 22, 1989

[54] CELLULAR WATERBED COMPONENT AND BED CONTAINING SAME

[76] Inventors: Angel M. Echevarria, 5416 La Crescenta Ave.; Michael A. Echevarria, 3550 Altura Ave., both of La Crescenta, Calif. 91214

[*] Notice: The portion of the term of this patent subsequent to Oct. 28, 2003 has been disclaimed.

[21] Appl. No.: 846,221

[22] Filed: Mar. 31, 1986

Related U.S. Application Data

[63] Continuation of Ser. No. 426,956, Sep. 29, 1982, Pat. No. 4,619,007.

[51] Int. Cl.$^4$ ............................ A47C 27/08; B65B 7/00
[52] U.S. Cl. ............................................... 5/451; 156/69
[58] Field of Search ............... 5/451, 452, 455, 449, 5/450; 156/69

[56] References Cited

U.S. PATENT DOCUMENTS

| | | |
|---|---|---|
| 95,848 | 10/1869 | Somes . |
| 184,487 | 11/1876 | White . |
| 779,576 | 1/1905 | Berryman . |
| 1,423,416 | 7/1922 | Gomes . |
| 1,578,787 | 3/1926 | Westren . |
| 1,733,034 | 10/1928 | Tufenkjian . |
| 2,345,421 | 5/1941 | Perry . |
| 2,529,637 | 11/1950 | Sonnett et al. . |
| 2,584,095 | 1/1952 | Slaughter . |
| 2,627,302 | 2/1953 | Forsyth . |
| 2,751,319 | 6/1956 | Carlson . |
| 2,823,394 | 2/1958 | Smith . |
| 3,166,995 | 1/1965 | Afsanick . |
| 3,346,435 | 10/1967 | Beck . |
| 3,459,179 | 8/1966 | Olesen . |
| 3,558,397 | 1/1971 | Clark . |
| 3,564,628 | 2/1971 | Oxford . |
| 3,595,835 | 6/1976 | Nos . |
| 3,702,484 | 11/1972 | Tobinick et al. . |
| 3,736,604 | 6/1973 | Carson, Jr. . |
| 3,741,849 | 6/1973 | Hardy . |
| 3,753,819 | 8/1973 | Mollura ................................. 5/451 |
| 3,753,823 | 8/1973 | Kuss . |
| 3,825,172 | 7/1974 | Mollura . |
| 3,867,731 | 2/1975 | Isaac . |
| 3,914,811 | 10/1975 | Francis ................................. 5/455 |
| 3,999,539 | 12/1976 | Meador . |
| 4,015,299 | 4/1977 | Tinnel . |
| 4,038,712 | 8/1977 | Miller . |

(List continued on next page.)

FOREIGN PATENT DOCUMENTS

| | | |
|---|---|---|
| 1224 | of 0000 | Chile . |
| 2801 | of 1878 | United Kingdom . |
| 741991 | 12/1955 | United Kingdom . |
| 763254 | 12/1956 | United Kingdom . |
| 1004112 | 9/1965 | United Kingdom . |
| 1381952 | 1/1975 | United Kingdom . |

*Primary Examiner*—Alexander Grosz
*Attorney, Agent, or Firm*—Henry M. Bissell

[57] ABSTRACT

A waterbed contains a plurality of pliant plastic cylindrical containers, closed at both ends by end caps, one of which has a re-closable fill opening. In the preferred embodiment, the containers are fabricated by first extruding a polymer mixture into a tubular configuration and cutting to the desired length. One end of the tubing is framed by a support member in such a way that a portion of the end of the tube folds over the support member. The support member is constructed in a manner so that it may be disassembled into two sections. A flat end piece section is then placed over the assembly and the thus-formed end assembly is positioned within a support fixture such that the sealing end surface of the assembly is supported on the upper face of the support fixture. The fixture is then moved to a sealing area where an induction heater generates sufficient heat to heat seal the flat end piece to the end of the tubular member. After the seal is completed, the support member is moved within the tubular member to a position adjacent the other end of the tubular member and the previous steps are repeated to seal the other end. A fill opening is provided on the flat end piece section completing the seal so that the internal support member can be disassembled and the pieces removed through the fill opening.

16 Claims, 2 Drawing Sheets

U.S. PATENT DOCUMENTS

| | | |
|---|---|---|
| 4,067,078 | 1/1978 | Winston . |
| 4,163,297 | 8/1979 | Newmark . |
| 4,167,432 | 9/1979 | Mollura . |
| 4,168,555 | 9/1979 | Benjamin . |
| 4,172,301 | 10/1979 | Everard et al. . |
| 4,187,567 | 2/1980 | Crowther . |
| 4,201,306 | 5/1980 | DuBois et al. . |
| 4,218,274 | 8/1980 | Mollura . |
| 4,221,013 | 9/1980 | Echevarria ............................ 5/451 |
| 4,229,929 | 10/1980 | Vajtay . |
| 4,245,364 | 1/1981 | Calleance . |
| 4,281,425 | 8/1981 | Jacobs . |
| 4,297,755 | 11/1981 | Mollura . |
| 4,321,719 | 3/1982 | Mollura . |
| 4,337,104 | 6/1982 | Lynn ..................................... 156/69 |
| 4,346,489 | 8/1982 | McMullan . |
| 4,389,742 | 6/1983 | DeWitt . |

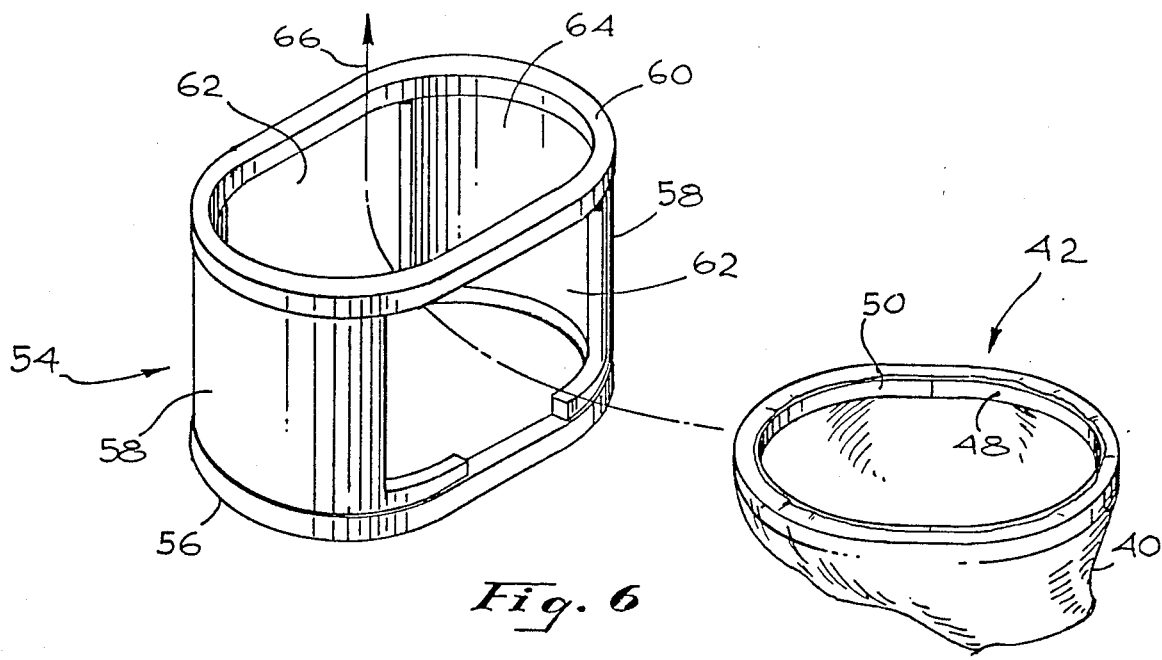
Fig. 6
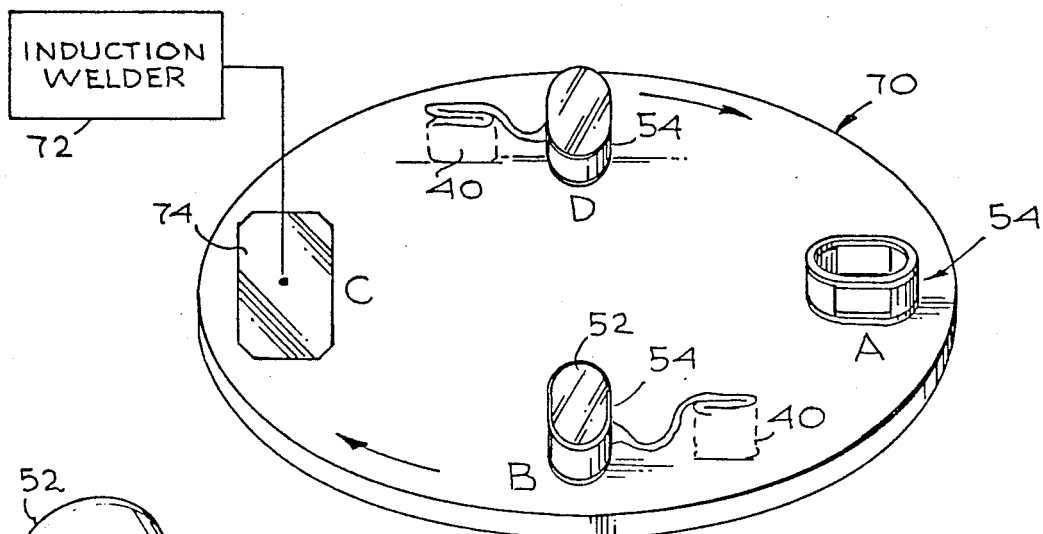
Fig. 7
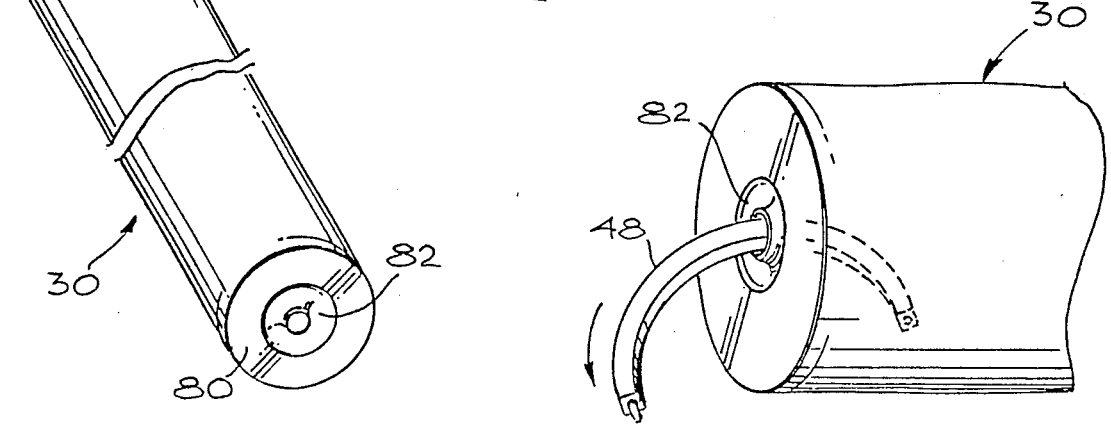
Fig. 8
Fig. 9

CELLULAR WATERBED COMPONENT AND BED CONTAINING SAME

This is a continuation of application Ser. No. 426,956, filed Sep. 29, 1982 now U.S. Pat. No. 4,619,007.

BACKGROUND OF THE INVENTION

1. Field of the Invention

The invention relates to fluid flotation sleep systems, commonly known as waterbeds, and in particular to a method of manufacturing water containers utilized therein and the product produced thereby.

2. Description of the Prior Art

Conventional waterbed construction has relied on the use of water mattresses which are basically unitary liquid-containing bags, cut and sealed in the basic shape that the mattress is to assume. The mattresses are ordinarily held in place by a rigid frame, and the rough shape of the mattress conforms by virtue of the fluidity of the water contained therein to the usually rather distortable restrictions of the construction of the mattress itself and to the confines of the frame. Samples of this type of construction are shown in Patents 3,753,819 of Mollura and 3,753,823 of Kuss. The disadvantages of this type of construction are well known: the mattress is extremely awkward and heavy when filled; it is prone to develop leaks; there is no easy stepwise procedure for filling; and considerable undesirable wave motion and general instability result in use. Furthermore, the requirement for a rigid support surrounding the flexible mattress poses a hazard unless the support is sufficiently well padded to shield against inadvertent collisions.

An improvement to this traditional construction is disclosed in Patent 4,221,013 of Angel M. Echevarria, one of the inventors herein. The patent discloses a mattress which comprises a foam box filled with a series of elongated water containers, each container containing water or other similar liquid such that the containers fill the entire cavity of the foam box. This results in a more adaptable design in which the compartments can be filled separately and to any level desired to increase the user's comfort, and in which any leaks incurred can be limited to each separate elongated water container.

Although the detail process for making the water containers was not disclosed in that prior patent, a standard calendaring process was utilized. In particular, individual sheets of plastic were lapped with the overlap thereafter being sealed. The length of the seam, however, extended over the entire length of each water container. Although the separate water containers disclosed in that patent performed satisfactorily, the relatively long seam length is somewhat difficult to seal and leakage may occur after extended use. What is desired therefore is an improved process for constructing the water containers which would result in a much shorter seam segment and thus provide greater stability. Although a process for fabricating inflatable tubular members using an extrusion process for use in an air mattress is disclosed in the Francis Patent 3,914,811, the process is not feasible for use in waterbed construction.

SUMMARY OF THE INVENTION

In brief, arrangements in accordance with the present invention comprise plastic liquid containers which are suitable for use in water beds which are made of seamless tubing that is closed at both ends. The closure is effected by using at least one end cap, but preferably both ends are closed by end caps which are affixed to the tube at opposite ends. The containers are fabricated by first extruding a polymer mixture into a tubular configuration and cutting to the desired length. In the method of the invention, one end of the tubing is framed by a support member such that a portion at the very end of the tube folds over the support member. The support member is constructed in a manner so that it may be disassembled into preferably two sections. A support member and associated end of the tube are positioned within and on a fixture which is mounted on a turntable. Next, an end piece, precut to fit the end of the tube with a slight overlap, is placed on the support member so as to overlap the folded-over end. The table is then rotated to move the fixture to an induction heater which, when energized, welds the end piece to the end of the tubular member. After the seal is completed, the support member and associated tube are removed from the fixture and the support member within the tube is moved to the opposite end where it is again placed in position within the end of the tube so that the free edge folds over the support member. This end with the support member therein is then placed within and on a fixture on the turntable and another precut end piece, this one having a water fill opening and associated end cap prefabricated therein, is placed on the support member so as to overlap the folded-over end of the tube. The induction welding step is repeated and the tube and support member are removed from the fixture. The support member is thereafter released within the now totally closed tube, its two parts are disassembled and removed through the water fill opening. The finished tube is then inflated with air and stored for a period of time, preferably eight hours or more, to test for leaks. If no leaks are found, the tube is deflated and packed with other tubes fabricated by the same method for inclusion in a finished water bed.

The invention is not limited to induction welding of the end pieces to the tube. Other ways of affixing the end caps are known, and it would be possible to use one or another of these procedures in the practice of the invention. For example, an end cap may be affixed to the folded-over end of the extruded tube by adhesive, by solvent bonding and possibly by other means known in the art for sealing plastic surfaces together.

BRIEF DESCRIPTION OF THE DRAWING

A better understanding of the present invention may be had from a consideration of the following detailed description, taken in conjunction with the accompanying drawing in which:

FIG. 6 is a view showing the construction of a support fixture in the manner in which the tube and support member are mounted thereon in preparation for the sealing of the end piece;

FIG. 7 is a schematic view illustrating the fabrication method steps of the present invention;

FIG. 8 shows a completed water container of the present invention; and

FIG. 9 shows the final step in the fabrication of the liquid container of the invention.

DESCRIPTION OF THE PREFERRED EMBODIMENT

Figure 1:
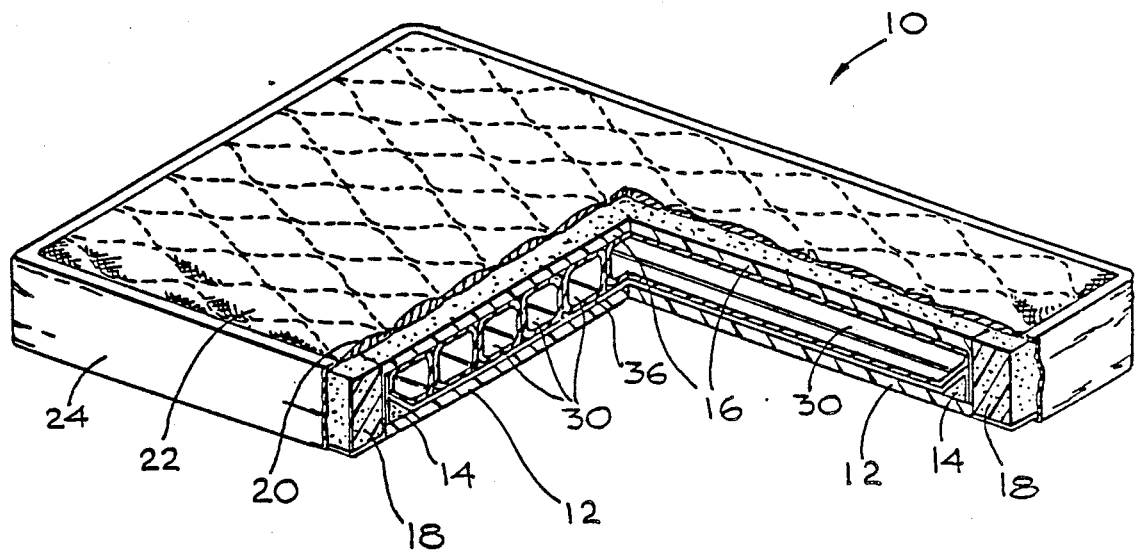
FIG. 1 is a perspective view, partially broken away, of a water bed mattress in which the tubular member of the present invention may be utilized.

In order to put the present invention in perspective, a brief description of a flotation sleeping surface in which the fabricated water container of the present invention may be utilized will first be set forth. Specific details of the construction, other than the fabrication of the water container, can be found in the aforementioned Patent No. 4,221,013, the teachings of which are necessary for an understanding of the present invention being incorporated herein by reference. FIG. 1 illustrates fluid flotation sleeping surface 10. The exterior of the structure is formed as a pair of bordered panels or frames, the outer margins of which have substantial height and register together so as to define an interior cavity or enclosed volume into which the water-filled containers can be incorporated. The bottom panel structure comprises a base urethane foam sheet 12, to the outer periphery of which is secured a border member comprising a wedge-shaped or inclined foam wall 14 which is joined to the margin of the base foam sheet 12 about its periphery. The area defined within the inclined surfaces of the wedges 14 comprises a well or open cavity under the principal sleeping surface of the mattress 10. The top panel has a centrally disposed urethane foam layer 16 and an outer peripheral border of resilient foam 18 of rectangular cross-section that is substantially the height of the mattress. The mattress cover comprises a quilted top surface of polyurethane foam and polyester ticking, the foam layer 20 being of substantial height so that the foam layer 20 is unified with the ticking 22. A side quilted margin 24, which may be of urethane fabric, extends around the periphery.

Within the interior of the enclosed volume thus defined when the top panel is registered over the bottom panel there is disposed a plurality of water containers 30, formed in accordance with the teachings of the present invention, in the form of elongated sealed tubes having a nominal diameter of appproximately 5" when filled with water. For a king size sleeping surface, nine of the water containers, or tubes, 30 are sufficient. With tubes of this size, each takes from 50 to 70 pounds of water when substantially filled with the recommended amount of water. Each tube also includes a fill opening, shown in FIG. 8, which will be described in more detail hereinafter. The tubes 30 are pliant and flexible, in the sense that they conform freely to the body of a user of the bed when the tube is substantially filled. The tubes 30 can be filled to varying degrees so as to comprise a range of support for the sleeping surface. The support can be uniform across the area, or varied with different tubes. With a double or large size bed, to be used by two persons, support on each side can be tailored to the desires of each individual. Under the tubes 30 and disposed across the top of the bottom panel, is a water barrier or collector sheet 36 which fits into the concavity defined by the top of the foam sheet 12 and within the inclined surfaces defined by the wedges 14. It is advantageous, for cost and durability purposes, to use tubes 30 of approximately 20 mil thick plastic, and the water barrier sheet 36 may be of 10 mil thick plastic. Other thicknesses of materials may be used as appropriate for the materials employed, the specific use to be made of the product and other considerations which may apply.

Additional details of assembling flotation sleeping surface 10, can be found in the aforementioned Patent No. 4,221,013.

Figure 2:
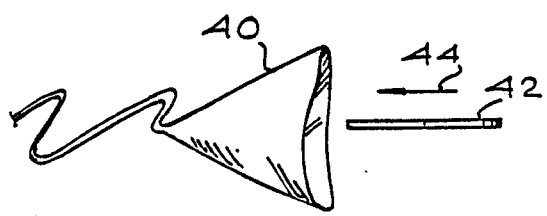
FIGS. 2 and 3 illustrate in a simplified form, the insertion of a support member into the extruded tubular member in order to form one end of the tube.
Figure 3:
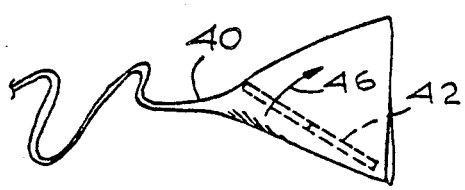
Figure 4:
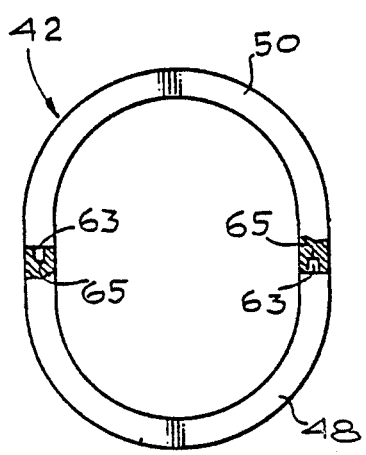
FIG. 4 shows a particular embodiment of the two-piece support member.

FIGS. 2 and 3 illustrate in simplified form the initial steps in fabricating the water container 30 of the present invention. In particular, plastic tubing 40 having a length corresponding to the desired length when inserted in mattress 10 is first extruded. A support member 42, shown in more detail in FIG. 4, is moved toward the inner core area of the extruded plastic tubing 40 in the direction of arrow 44. FIG. 3 illustrates the support member 42 already inserted within the core area of tubing 40 and in the process of being rotated in the direction of arrow 46 to form a defined edge of tubing 40 as will be explained hereinafter.

Referring now to FIG. 4, the support member or ring 42 consists of two pieces 48 and 50 which are integrated with each other through pegs 63 and receptor holes 65. Of course, support member 42 may be made of more than two pieces so long as the construction is such that it can be held rigidly together when desired and, when disassembled, can pass through the fill opening of the finished tubular container.

Figure 5:
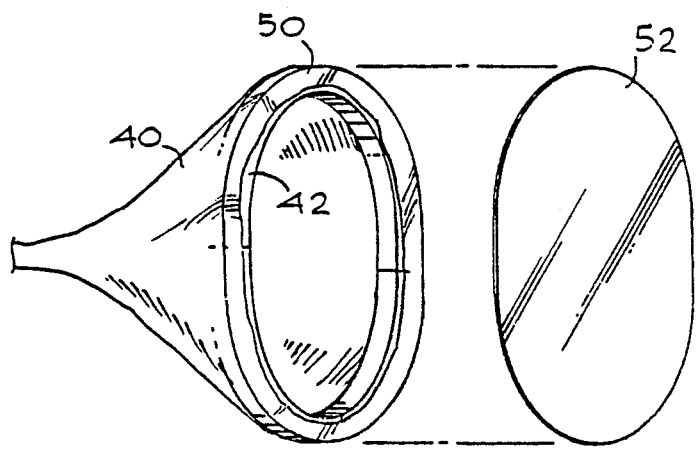
FIG. 5 shows one end of a tubular member with the ends overlapping the support member, together with an end piece in preparation for positioning across the end of the tube.

As shown in more detail in FIG. 5, the support member 42 is first inserted at the end of tubing 40 (see FIGS. 3 and 4) and the ends 50 of the tubing 40 folded over the flat end of the support member 42. The nature of the plastic material of the tubing is such that it hugs the surface of the support member when the tubing is stretched by the insertion of the support member into the position shown in FIG. 5. This serves to provide a smooth, wrinkle-free surface at the end of the tube to which an end piece may be affixed in sealing relationship.

The end of the tube and its support member are now ready for positioning on a support fixture 54, shown in FIG. 6. This support fixture is mounted at a station on a turntable (see FIG. 7) and has a base 56, side walls 58 and an upper, generally ring-shaped portion 60, generally matching the configuration of the support member 42. A pair of openings 62 are provided in the side walls 58 and the support member 42 is inserted through one of the side walls 58 and upward through the upper opening 64, moving in the direction of the arrows 66. After it is passed through the upper opening 64, with the tubing 40 extending down and outward through the side opening 62, the support member 42 is aligned with and placed on the upper member 60 of the support fixture 54. An end piece 52, cut to the general shape of the support member 42 and dimensioned to overlap the end of the tube 40 on the upper surface of the support member 42 is placed over the end in preparation for sealing.

FIG. 7 shows a plurality of fixtures 54 mounted at different work stations on a turntable 70. In the fabrication process of the present invention, the support member 42 with affixed tubing 40 are installed in the work station A, in the manner illustrated in FIG. 6. The turntable 70 is then rotated and end piece 52 is placed in position at work station B. Rotation of the turntable 70 again moves the assembly to work station C, adjacent an induction welder 72. Such a welder, also known as an R.F. heat sealer, is commercially available from Cosmos Electronic Machine Corp., Farmingdale, New York, among others. A metal plate 74 is placed over the assembly and beneath the welder 72. When the welder in energized, the end piece 52 becomes heat sealed to the end of the tubing 40. The turntable 70 is again rotated so that the assembly is now at work station D, where it can be removed from the support fixture 54 through a reversal of the insertion step shown in FIG. 6. Except for the welding step, the procedure would be essentially the same for the other ways of affixing the end cap(s) to the tube which are mentioned hereinabove. Although not considered as effective as the procedure of heat sealing both end caps in the method described herein, it would be possible to practice the invention by closing one end of the tube in the manner disclosed in the Francis patent 3,914,811 cited above (the end is crimped closed and heat sealed somewhat in the manner of the commonly available "Seal-A-Meal" process for home use in saving left-over meal portions, bagging lunches, etc.). The other end cap with the fill opening would be preferably heat welded as described hereinabove.

After the assembly of tubing 40, support member 42 and sealed end piece 52 are removed from work station D, air is blown into the open end of the tube to separate the sides thereof so that the support member 42 can be moved to the other end of the tube 40 and placed in position thereat, repeating the step shown in FIG. 3. The open end of the tube 40 with support member 42 mounted therein is now inserted back into fixture 54 at station A (in the manner shown in FIG. 6) and the steps described above are repeated, except that an end piece 80 (see FIG. 8) having a fill opening 82 is placed in the position shown for the end piece 52 at station B in FIG. 7. This piece 80 is heat sealed in the induction welder 72 at station C in the manner already described. The assembly is now removed at station D and the tube 30 with its sealed end pieces 52 and 80 has the configuration (when inflated) illustrated in FIG. 8.

The final fabrication step is completed in FIG. 9 by the removal of the pieces making up the support member 42. Removal through the small fill opening is made possible by the parts being separate in the configuration shown and being disassembleable by manipulation within the tube 30. FIG. 9 shows one of the pieces 48 being thus removed from the finished tube 30. To test for leaks, the tube 30 is inflated and let stand for several hours, preferably overnight, to determine if it holds air. If any leaks are detected, the unit is discarded. However, the fabrication method of the present invention is so effective that no more than one or two percent of the units fabricated by this method are found to have any leaks.

The material used for the extruded tubing 40 and the end pieces 52 and 80 may be any suitable plastic. Flexible polyvinyl chloride has been found to be a suitable polymer for this purpose and is preferred. Other materials which share similar properties of extrudability and capacity to heat seal may be substituted.

Although there have been described above specific arrangements of a cellular water bed component and method of manufacture in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. In a fluid flotation sleeping surface construction having an interior cavity and wherein a plurality of separate liquid containers are adapted to be disposed within the cavity, the improvement comprising a plurality of liquid containers disposed therein, each liquid container comprising an elongated tubular member closed at both ends, each end having an end piece affixed thereto in sealing relationship, the elongated tubular member being seamless between its ends, each end of the tubular member being formed to establish a smooth, wrinkle-free surface to which the end piece is attached by resort to a disassembleable thin annular backing member constructed of at least two pieces which is positioned within the container, one of said end pieces defining a fill opening which is substantially smaller than the lateral extent of the annular backing member when it is assembled but through which the individual pieces of the backing member, when disassembled, may be removed.

2. The combination of claim 1 wherein said fill opening is the only opening in the container.

3. The combination of claim 2 wherein the elongated member and end pieces are constructed of a pliant plastic material, and the end pieces are affixed to the tubular member by fusing of the adjacent surfaces of the end pieces and tubular member together.

4. The combination of claim 3 wherein said material is polyvinyl chloride.

5. The combination of claim 1 wherein said elongated member is a generally cylindrical tube formed by an extruding process.

6. A closed liquid container for use with a plurality of other like containers in a waterbed structure comprising an elongated pliant tubular member closed at both ends by respective end pieces affixed to the corresponding opposite ends of the member in sealing relationship, each end of the elongated member to which the associated end piece is affixed being formed to establish a smooth, wrinkle-free surface to which the end piece is attached by resort to a disassembleable thin annular backing member constructed of at least two pieces which is positioned within the container, at least one end piece defining a fill opening which is substantially smaller in diameter than the lateral extent of the annular backing member when it is assembled but through which the individual pieces of the backing member, when disassembled, may be removed;

said fill opening being the only opening available for removal of the pieces of the disassembled backing member.

7. The container of claim 6 further comprising an end piece affixed to each end of the member in sealing relationship.

8. The container of claim 7 wherein said fill opening is the only opening into the container, and further including a releasable closure therefor.

9. The combination of claim 7 wherein the elongated member and end pieces are constructed of a pliant plastic material, and the end pieces are affixed to the tubular member by fusing of the adjacent surfaces of the end pieces and tubular member together.

10. The container of claim 9 wherein said material is polyvinyl chloride.

11. The container of claim 6 wherein said elongated member is a generally cylindrical tube formed by an extruding process.

12. A closed liquid container adapted for use with a plurality of like containers in a waterbed, the container comprising:

an elongate pliable tubular member;
a pair of end closures, one at each end of the tubular member, each end closure including:
 (a) a formed end surface extending radially inward about the tubular member, the end surface being smooth and wrinkle-free, and
 (b) an end piece approximating in extent the transverse dimensions of the tubular member and overlapping the end surface, the end piece being sealingly affixed to the formed end surface in a lap welded joint
closing the end of the tubular member;
the affixing of the end piece to the formed end surface being effected by resort to a disassembleable thin annular backing member constructed of at least two pieces which is positioned within the container;
one of said end pieces defining a fill opening which is substantially smaller than the lateral extent of the annular backing member when it is assembled but through which the individual pieces of the backing member, when disassembled, may be removed;
said fill opening being the only opening available for removal of the pieces of the disassembled backing member.

13. The container of claim 12 wherein the tubular member and the end pieces are constructed of pliant plastic material with the end pieces being fused to the end surfaces of the tubular member.

14. The container of claim 13 wherein the tubular member is seamless, being formed by an extrusion process.

15. A fluid flotation sleeping surface construction having an interior cavity and wherein a plurality of individual closed liquid containers as defined in claim 12 are disposed within the cavity for filling with liquid to provide support to the sleeping surface.

16. A waterbed comprising a plurality of panels assembled to form a base and peripheral border frame defining an interior cavity for receiving and supporting a plurality of individual closed liquid containers as defined in claim 12 positioned in side-by-side relationship within said cavity; and
a covering for extending over the containers to close said cavity.

* * * * *